US011772733B2

(12) United States Patent
Tan et al.

(10) Patent No.: US 11,772,733 B2
(45) Date of Patent: Oct. 3, 2023

(54) ADJUSTABLE CAGE FOR VARIOUS BOTTLE SIZES

(71) Applicant: ROAR & SOAR INTERNATIONAL CO., LTD., Taichung (TW)

(72) Inventors: Tell Tan, Taichung (TW); Yen-Yu Chen, Taichung (TW)

(*) Notice: Subject to any disclaimer, the term of this patent is extended or adjusted under 35 U.S.C. 154(b) by 695 days.

(21) Appl. No.: 17/000,881

(22) Filed: Aug. 24, 2020

(65) Prior Publication Data

US 2021/0155310 A1     May 27, 2021

(30) Foreign Application Priority Data

Nov. 21, 2019   (TW) ................................. 108215414

(51) Int. Cl.
*B62J 11/04*       (2020.01)
(52) U.S. Cl.
CPC ..................................... *B62J 11/04* (2020.02)
(58) Field of Classification Search
CPC ....... B62J 11/04; A47G 23/0225; F16M 11/14
USPC ..................................................... 248/311.2
See application file for complete search history.

(56) References Cited

U.S. PATENT DOCUMENTS

| 9,944,209 | B1* | 4/2018 | Carnevali | B60N 3/108 |
| 10,343,739 | B2* | 7/2019 | Vogt | B62J 11/04 |
| 10,492,606 | B2* | 12/2019 | Schaefer | A47F 7/283 |
| 2004/0178244 | A1* | 9/2004 | Houtte | B62J 11/04 |
| | | | | 224/926 |
| 2017/0349229 | A1* | 12/2017 | Drew | B62J 11/04 |

* cited by examiner

*Primary Examiner* — Todd M Epps
(74) *Attorney, Agent, or Firm* — Egbert, McDaniel & Swartz, PLLC (57) ABSTRACT

A bottle cage applicable to water bottles of different sizes, which includes a main body, a first girdle, a second girdle and a regulating structure. Wherein the first girdle is opposite to the main body, a storage space is formed between the main body and the first girdle. One end of the first girdle leans against one side of the main body. The second girdle is adjacent to the first girdle. One end of the second girdle leans against the other side of the main body. The regulating structure brakes reverse actuation of the first girdle and the second girdle, the enclosure of the storage space is changed for placing the water bottles of different sizes. The water bottle can be placed and taken by operating the regulating structure with one hand, and the usability is high.

12 Claims, 10 Drawing Sheets

ADJUSTABLE CAGE FOR VARIOUS BOTTLE SIZES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a bottle cage for placing a water bottle, and more particularly to a bottle cage applicable to water bottles of different sizes.

2. Description of Related Art Including Information Disclosed Under 37 CFR 1.97 and 37 CFR 1.98

The bottle cage is an article for placing a water bottle. The bottle cage is usually installed on one side of a tube, the tube is generally the down tube or stem of bicycle frame. The water bottle is placed on the bottle cage for the cyclist to replenish water when riding a bicycle.

A known adjustable bottle cage has a girdle, the girdle is provided with several insert holes for a bulge to fasten in, the storage space formed by the girdle can be changed by changing the insert hole the bulge fastens in, so as to place water bottles of different sizes.

The insert hole the bulge fastens in is adjusted according to the water bottle body, this operation usually depends on both hands, it is inconvenient.

BRIEF SUMMARY OF THE INVENTION

The primary object of the present invention is to provide a bottle cage applicable to water bottles of different sizes, which can easily change the size for the applicable water bottle body.

Based on said object, the present invention provides a bottle cage applicable to water bottles of different sizes, which comprises:

A main body, the main body is a cambered sheet, the main body is provided with a supporting plate from the bottom edge of cambered midsection to the cambered inner edge of the main body, the main body and the supporting plate enclose an open storage space, and the supporting plate is located in the lower part of the storage space, so that a water bottle can be placed in the storage space, two cambered ends of the main body are a first side and a second side respectively.

A first girdle, the first girdle is a cambered long band, the cambered inner edge of the first girdle is laterally opposite to the main body, and the storage space is formed between the main body and the first girdle. One end of the first girdle expands to form a first connecting part, the first connecting part leans against the outer side of the first side, and the first connecting part and the first side are riveted by a first pin. The first girdle penetrates a first elongated slot, both ends of the first elongated slot point at both ends of the first girdle respectively. The first girdle forms a first cage on the bottom edge of the first elongated slot, several first convex teeth of the first cage protrude upwards into the first elongated slot.

A second girdle, the second girdle is a cambered long band, the cambered inner edge of the second girdle is adjacent to the cambered outer edge of the first girdle. One end of the second girdle expands to form a second connecting part. The second connecting part leans against the outer side of the second side, and the second connecting part and the second side are riveted by a second pin. The second connecting part is provided with a through groove, so that the first girdle passes through the through groove. The second girdle penetrates a second elongated slot. Both ends of the second elongated slot point at both ends of the second girdle respectively. The second girdle forms a second cage on the top edge of the second elongated slot. Several second convex teeth of the second cage protrude downwards into the second elongated slot; and A regulating structure, the regulating structure comprises a base, a gear and an operational unit. The base laterally penetrates a channel, the first girdle and the second girdle penetrate through the channel, the gear is disposed in the channel, and the gear axially penetrates the first elongated slot and the second elongated slot. The gear engages with the first cage and the second cage, so that the gear brakes reverse actuation of the first girdle and the second girdle. The operational unit is fitted over one end of the base far from the main body, the operational unit is in contact with the gear, to brake the rotation of the gear, so as to change the enclosure of the storage space among the main body, the first girdle and the second girdle for placing the water bottles of different sizes.

The enclosure of the storage space can be reduced or enlarged by rotating the operational unit, so as to place the water bottles of different sizes, the water bottle can be placed and taken by operating the operational unit with only one hand, the usability is high.

DETAILED DESCRIPTION OF THE INVENTION

The embodiments of the bottle cage applicable to water bottles of different sizes of the present invention are for illustration only, the patent application is not limited to this structure.

As shown in FIG. 1 to FIG. 9, Embodiment 1 comprises a main body 10, a first girdle 20, a second girdle 30 and a regulating structure 40. Wherein the main body 10 is a cambered sheet, and the main body 10 can be made of elastic material. The main body 10 is provided with a supporting plate 11 from the bottom edge of cambered midsection to the cambered inner edge of the main body 10. The main body 10 and the supporting plate 11 enclose an open storage space 50, and the supporting plate 11 is located in the lower part of the storage space 50, so that a water bottle 90 can be placed in the storage space 50. Two cambered ends of the main body 10 are a first side 12 and a second side 13 respectively.

The first girdle 20 is a cambered long band, the cambered inner edge of the first girdle 20 is laterally opposite to the main body 10, and the storage space 50 is formed between the main body 10 and the first girdle 20. One end of the first girdle 20 expands to form a first connecting part 21, the first connecting part 21 leans against the outer side of the first side 12, and the first connecting part 21 and the first side 12 are riveted by a first pin 22. The first girdle 20 penetrates a first elongated slot 23, both ends of the first elongated slot 23 point at both ends of the first girdle 20 respectively. The first girdle 20 forms a first cage 24 on the bottom edge of the first elongated slot 23, several first convex teeth 25 of the first cage 24 protrude upwards into the first elongated slot 23.

The second girdle 30 is a cambered long band, the cambered inner edge of the second girdle 30 is adjacent to the cambered outer edge of the first girdle 20. One end of the second girdle 30 expands to form a second connecting part 31. The second connecting part 31 leans against the outer side of the second side 13, and the second connecting part 31 and the second side 13 are riveted by a second pin 32. The second connecting part 31 is provided with a through groove 33, so that one end of the first girdle 20 far from the first connecting part 21 passes through the through groove 33. The second girdle 30 penetrates a second elongated slot 34. Both ends of the second elongated slot 34 point at both ends of the second girdle 30 respectively. The second girdle 30 forms a second cage 35 on the top edge of the second elongated slot 34. Several second convex teeth 36 of the second cage 35 protrude downwards into the second elongated slot 34.

The regulating structure 40 comprises a base 42, a gear 44 and an operational unit 46. Wherein the base 42 laterally penetrates a channel 421, the first girdle 20 and the second girdle 30 penetrate through the channel 421 respectively, the gear 44 is disposed in the channel 421, and the gear 44 axially penetrates the first elongated slot 23 and the second elongated slot 34. The gear 44 engages with the first cage 24 and the second cage 35, hereby, the gear 44 brakes reverse actuation of the first girdle 20 and the second girdle 30 when the gear 44 rotates, so as to change the enclosure size of the storage space 50 for the water bottle 90. The operational unit 46 is fitted over one end of the base 42 far from the main body 10, the operational unit 46 is in contact with the gear 44, so that the operational unit 46 brakes progressive rotation of the gear 44, so as to change the enclosure of the storage space 50 among the main body 10, the first girdle 20 and the second girdle 30 for placing the water bottles 90 of different sizes.

The water bottle 90 is placed in the storage space 50 from the top of the storage space 50. The supporting plate 11 supports the water bottle 90 at the bottom of the water bottle 90, the operational unit 46 is rotated to rotate the gear 44, so as to brake mutual dislocation of the first girdle 20 and the second girdle 30. The first side 12 and the second side 13 are drawn by the first girdle 20 and the second girdle 30, leaning against both sides of the water bottle 90 respectively. The first girdle 20 and the second girdle 30 restrain one side of the water bottle 90 far from the main body 10, so that the water bottle 90 can be located in the storage space 50.

Figure 8:
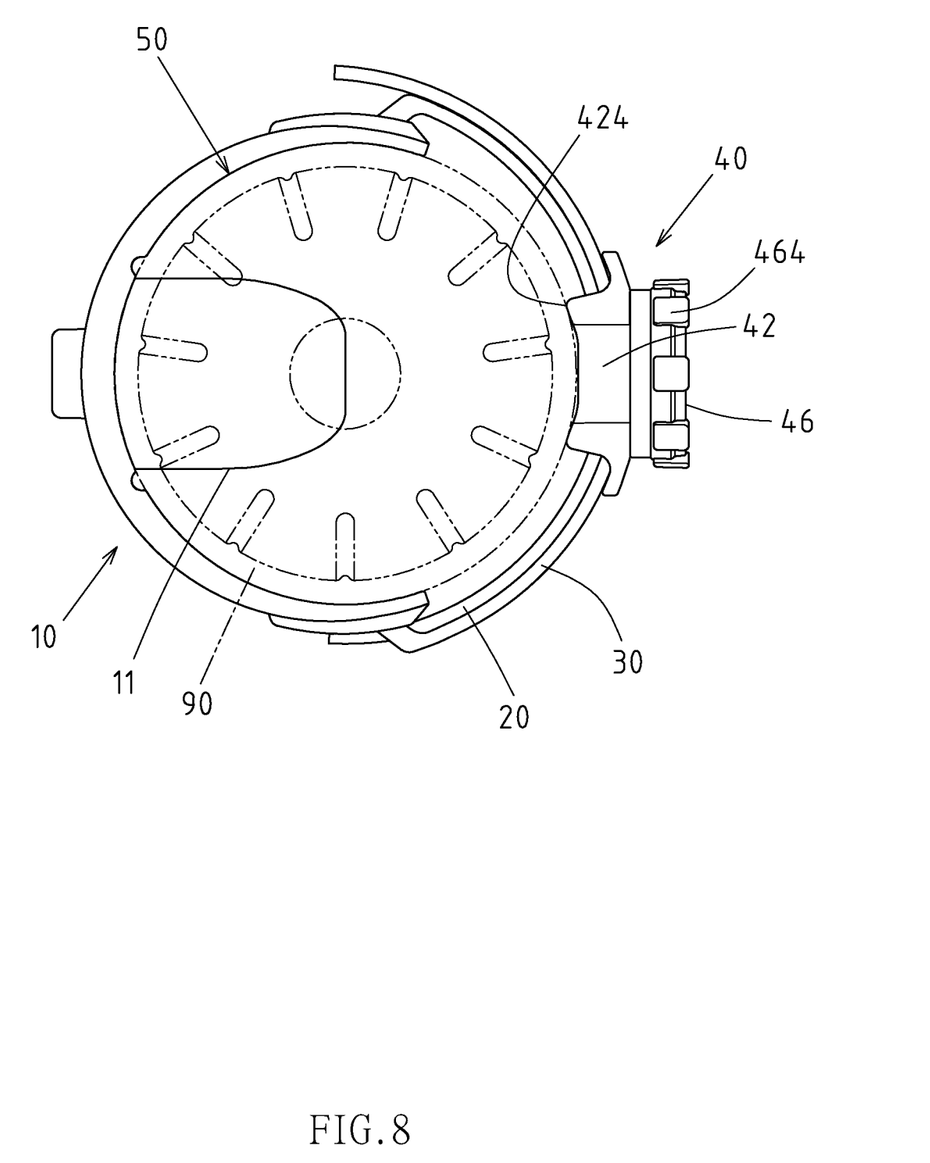
FIG. 8 is a top view of operating state (1) of Embodiment 1 of the present invention.
Figure 9:
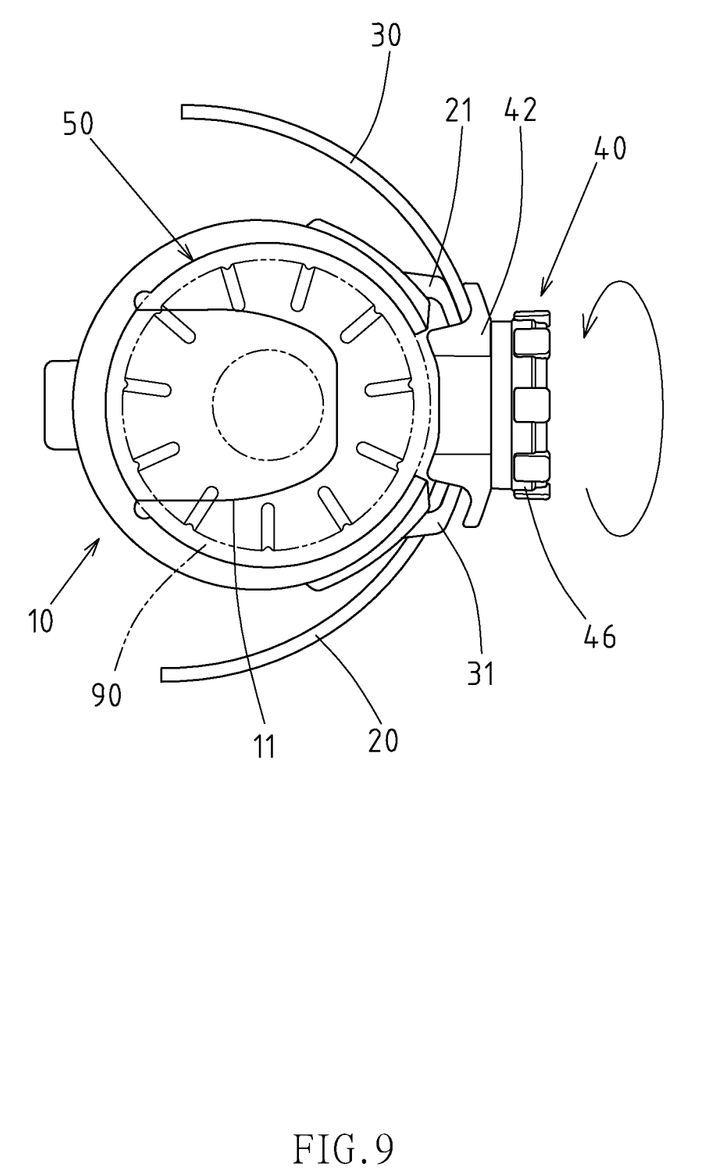
FIG. 9 is a top view of operating state (2) of Embodiment 1 of the present invention.

To take out the water bottle 90, the enclosure of the storage space 50 can be enlarged by rotating the operational unit 46, so that it is easy to take the water bottle 90 out of the storage space 50. The enclosure of the storage space 50 can be reduced or enlarged by rotating the operational unit 46. The water bottle 90 can be placed or taken by rotating the operational unit 46 with one hand, the usability is high, as shown in FIGS. 8 and 9, the distance from the first girdle 20 and the second girdle 30 to the midsection of the main body 10 is changed according to the water bottle body size of the water bottle 90, the enclosure size of the storage space 50 is regulated to match the water bottle body size of the water bottle 90, so as to place the water bottles 90 of different sizes.

Moreover, a holding chamber 422 is formed inside the base 42, one end of the holding chamber 422 is connected to the channel 421, the other end of the holding chamber 422 is connected to one end of the base 42 far from the main body 10. Several third convex teeth 423 are configured annularly inside the holding chamber 422. One end in axial direction of the gear 44 is provided with a disc body 45, the disc body 45 is disposed in the holding chamber 422, the outer edge of the disc body 45 is adjacent to the third convex teeth 423. The disc body 45 axially penetrates several movable slots 451. One end of the movable slots 451 extends to the outer edge of the disc body 45. The disc body 45 forms several insertion openings 452. The disc body 45 forms a first side wall 453 and a second side wall 454 on the circumference of the insertion openings 452. The first side wall 453 is in contact with the outer edge of the disc body 45. The insertion openings 452 are adjacent to the movable slots 451 respectively. The disc body 45 forms a long propping part 455 between adjacent insertion openings 452 and movable slots 451. The second side wall 454 is formed on one side of the propping part 455, and the end of the propping part 455 obliquely props the preset third convex tooth 423. The operational unit 46 is axially provided with a shaft lever 461. The shaft lever 461 is axially pivoted on the gear 44 and the disc body 45. A bolt 462 is screwed in the shaft lever 461 through one end of the base 42 facing the main body 10, so as to fix the operational unit 46 to the base 42. The operational unit 46 is provided with several brake parts 463. The brake parts 463 extend to the insertion openings 452, and one side of the brake part 463 props the first side wall 453, the other side of the brake part 463 props the second side wall 454 near the end of the propping part 455, so that the operational unit 46 brakes progressive rotation of the disc body 45 linked with the gear 44 through the brake part 463 when the operational unit 46 is rotated.

Figure 6:
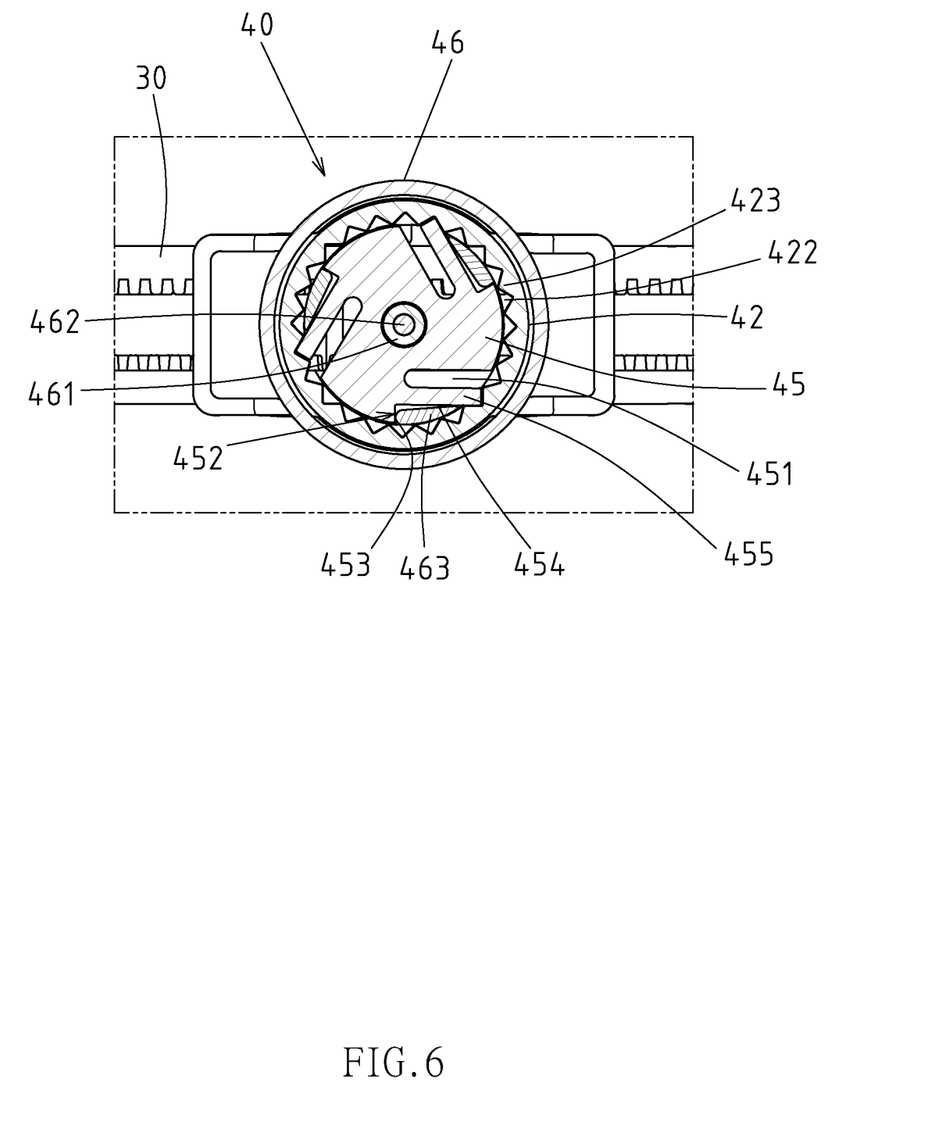
FIG. 6 is a sectional view of 6-6 in FIG. 3.

As shown in FIG. 6, when the operational unit 46 is rotated, the brake part 463 gyrates along a circular path centered on the shaft lever 461. When the brake part 463 moves clockwise, the brake part 463 presses the first side wall 453, and the disc body 45 rotates clockwise, at this point, the propping part 455 is embedded in the third convex teeth 423. When the brake part 463 moves anticlockwise, the brake part 463 forms a lateral pressure on the second side wall 454 through the part near the end of the propping part 455, forcing the end of the propping part 455 to elastically bend towards the movable slot 451, so that the end of the propping part 455 leaves the third convex tooth 423, the propping relation between the propping part 455 and the third convex tooth 423 is cancelled, and then the brake part 463 moves anticlockwise continuously, forcing the disc body 45 to rotate anticlockwise.

As mentioned above, the progressive rotation of the operational unit 46 can induce progressive rotation of the disc body 45 linked with the gear 44, so as to drive the first girdle 20 and the second girdle 30 to change the enclosure of the storage space 50. If the operational unit 46 is not rotated, but the first girdle 20 and the second girdle 30 are pulled or pushed backwards to rotate the gear 44, the enclosure of the storage space 50 is changed, when the disc body 45 presses the brake part 463 using the first side wall 453, the brake part 463 cannot press the propping part 455 to elastically bend, so the disc body 45 will not rotate anticlockwise, and the propping part 455 is constrained by the third convex tooth 423, the second side wall 454 cannot press the brake part 463, the disc body 45 cannot rotate clockwise as a result. Hereby, the enclosure of the storage space 50 can be changed only by progressive rotation of the operational unit 46, the positioning reliability of the water bottle 90 is high.

The junction 26 of the first connecting part 21 and the first girdle 20 is located between the first elongated slot 23 and the first side 12. The junction 37 of the second connecting part 31 and the second girdle 30 is located between the second elongated slot 34 and the second side 13. Hereby, as shown in FIG. 9, when the regulating structure 40 regulates the first girdle 20 and the second girdle 30 to move backwards for the water bottle 90 with a small water bottle body, and both sides of the base 42 prop the first connecting part 21 and the second connecting part 31 respectively, the base 42 cannot force the first girdle 20 and the second girdle 30 to continuously move towards the direction of further restraining the water bottle 90, at this point, the water bottle body size of the water bottle 90 which can be restrained effectively is very small.

Figure 1:
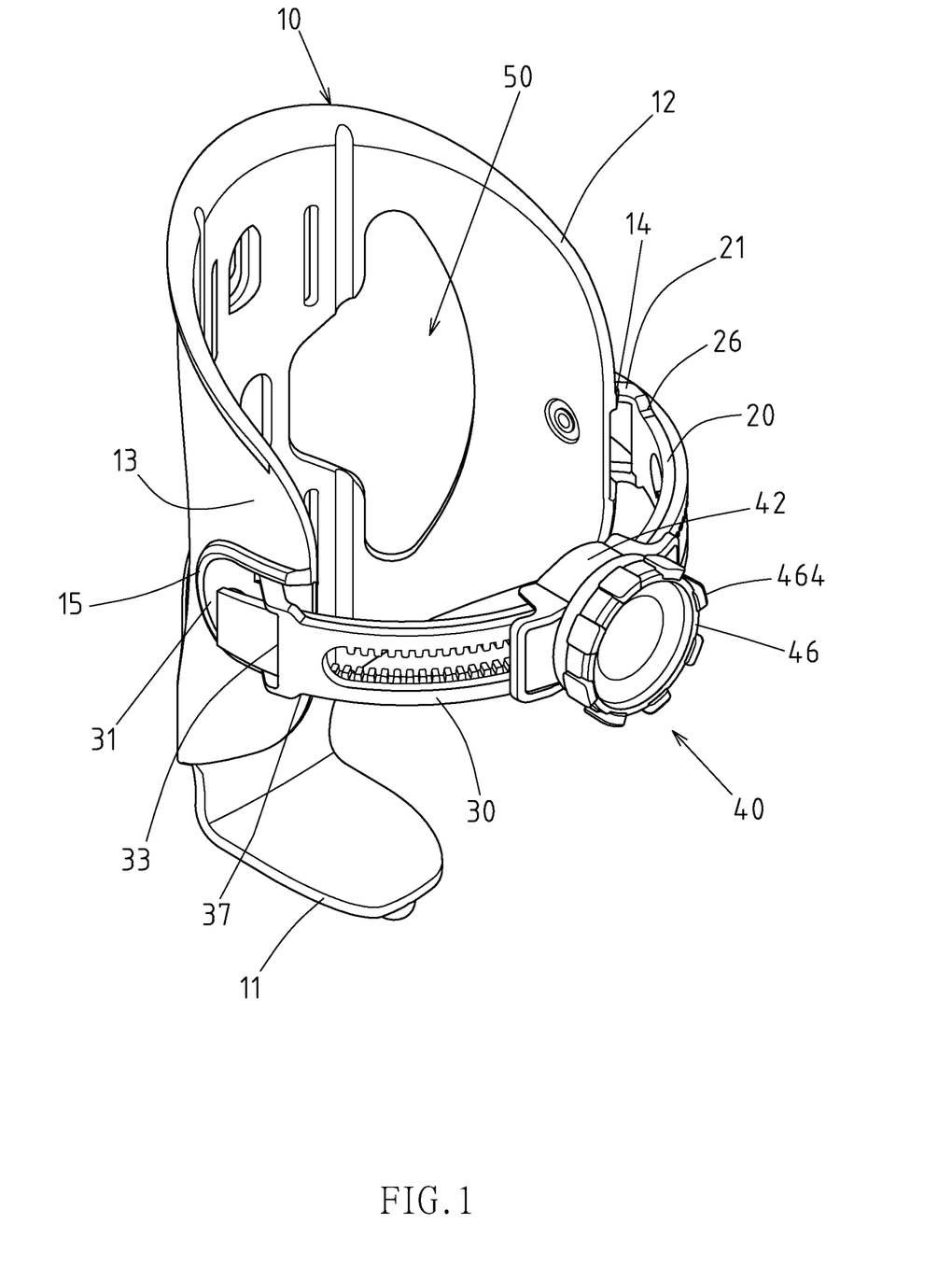
FIG. 1 is a perspective view of Embodiment 1 of the present invention.
Figure 3:
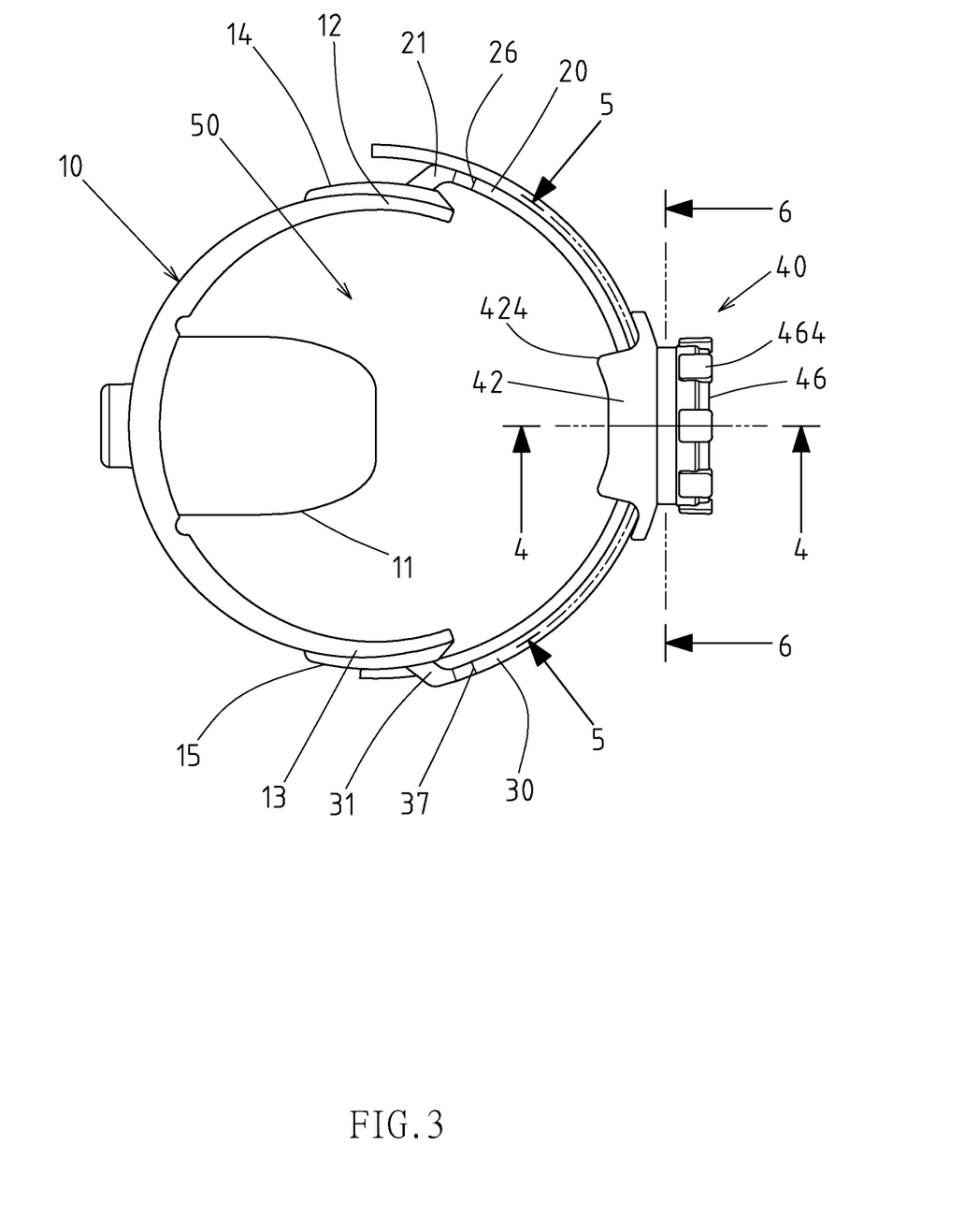
FIG. 3 is a top view of Embodiment 1 of the present invention.
Figure 4:
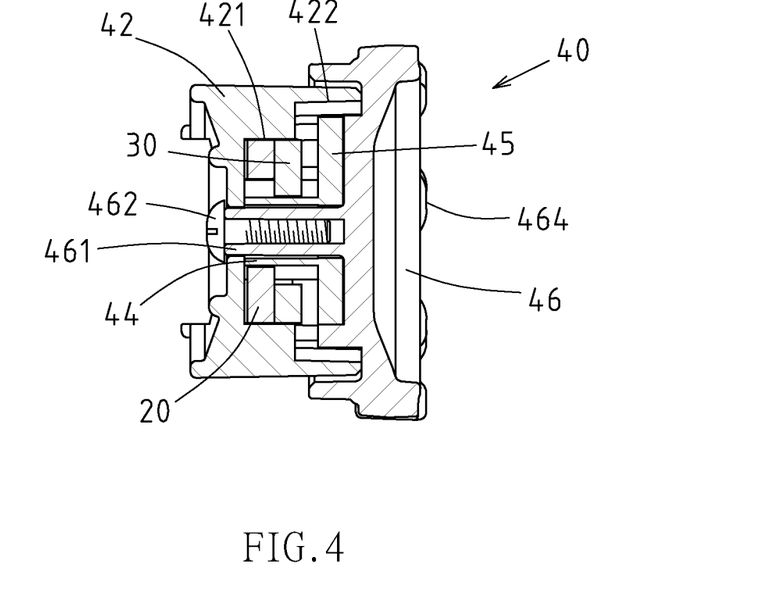
FIG. 4 is a sectional view of 4-4 in FIG. 3.
Figure 5:
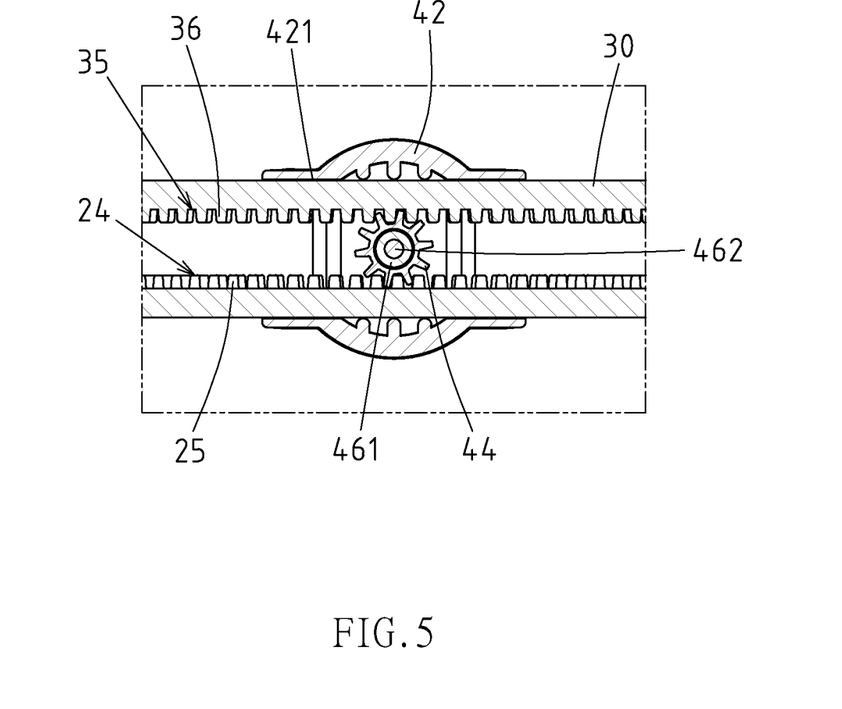
FIG. 5 is a sectional view of 5-5 in FIG. 3.
Figure 7:
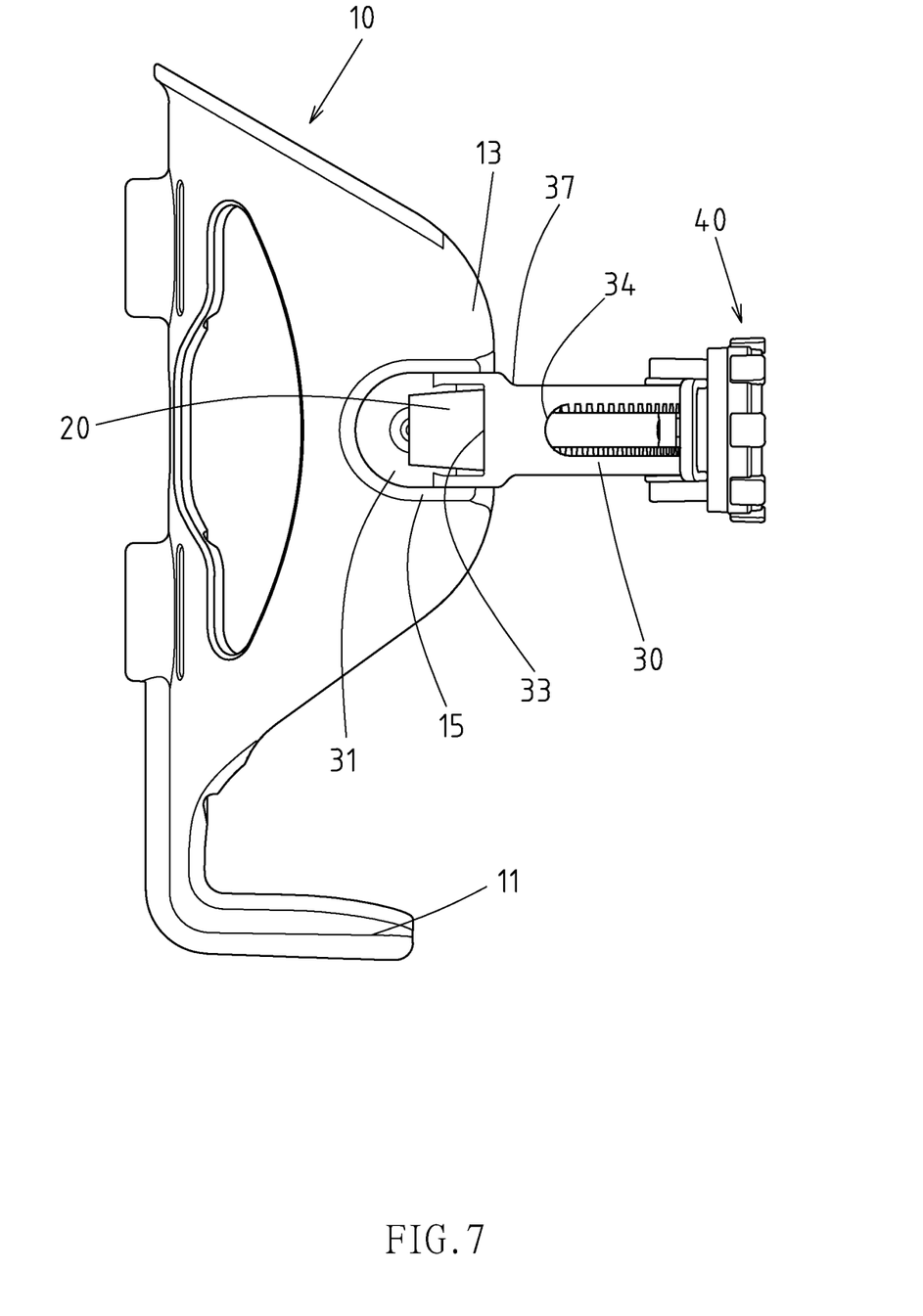
FIG. 7 is a left view of Embodiment 1 of the present invention.

As shown in FIGS. 1, 3, and 7, the lateral distance between one end of the first connecting part 21 near the regulating structure 40 and the first side 12 is less than or equal to 4 mm, and the lateral distance between one end of the second connecting part 31 near the regulating structure 40 and the second side 13 is less than or equal to 4 mm, hereby, as shown in FIG. 9, when the regulating structure 40 regulates the first girdle 20 and the second girdle 30 to move backwards for the water bottle 90 with a small water bottle body, and both sides of the base 42 prop the first connecting part 21 and the second connecting part 31 respectively, both sides of the base 42 approach the first side 12 and the second side 13 respectively, the water bottle body size of the water bottle 90 which can be placed in the storage space 50 is only about the sum of the internal circumference of the main body 10 and the lateral dimension of the base 42 facing the main body 10, so that the present invention is applicable to the water bottle 90 with a very small water bottle body size.

Figure 2:
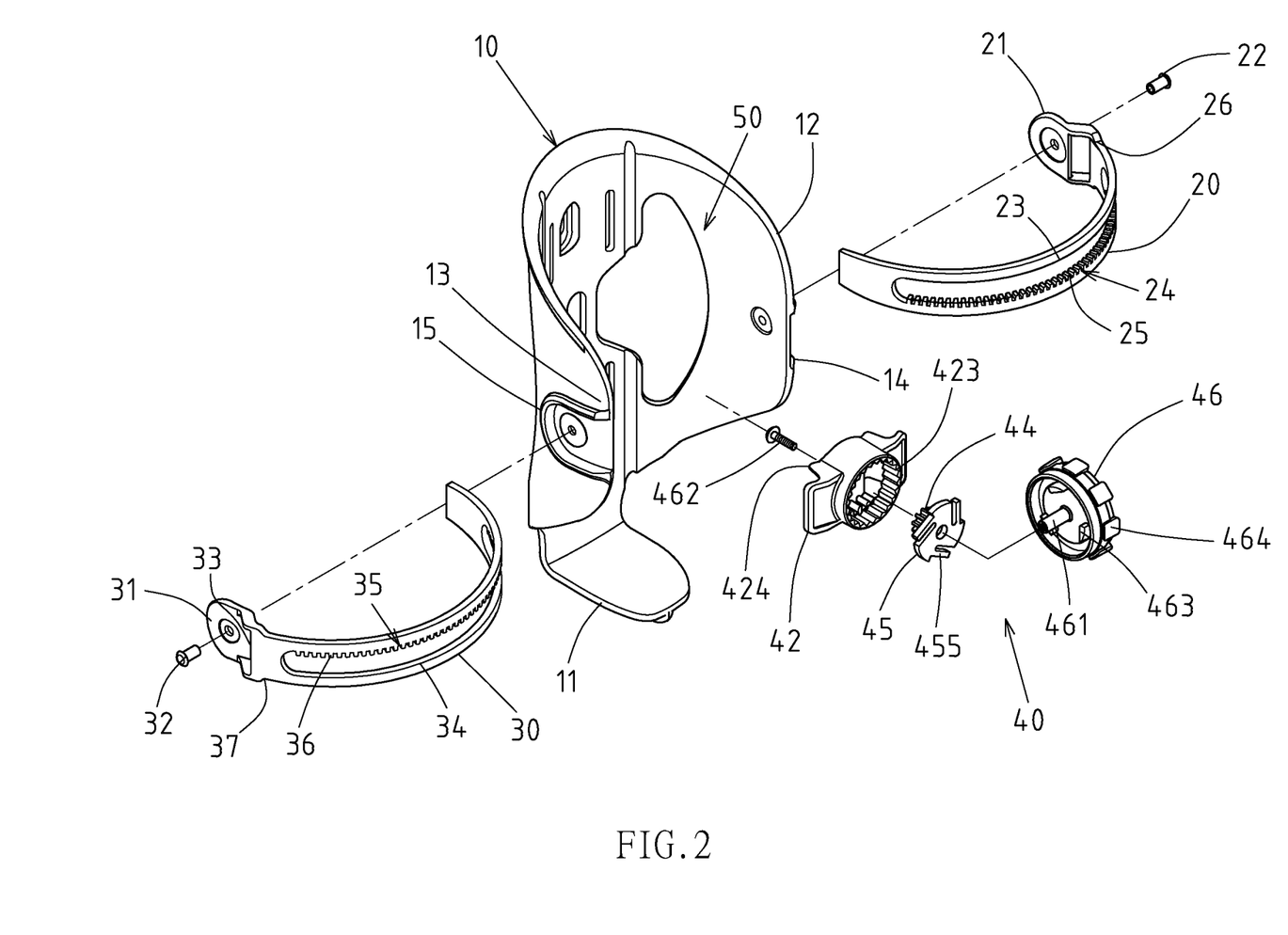
FIG. 2 is an exploded perspective diagram of Embodiment 1 of the present invention.

As shown in FIGS. 2, 3, and 7, a first bulge 14 protrudes on the outer side to the first side 12, the inner edge of the first bulge 14 is adjacent to the first connecting part 21, so as to position the first connecting part 21. A second bulge 15 protrudes on the outer side of the second side 13, the inner edge of the second bulge 15 is adjacent to the second connecting part 31, so as to position the second connecting part 31. The first bulge 14 constrains the first connecting part 21, so that the first girdle 20 cannot rotate round the first pin 22 as center arbitrarily. The second bulge 15 constrains the second connecting part 31, so that the second girdle 30 cannot rotate round the second pin 32 as center arbitrarily.

Several press parts 424 protrude towards the main body 10 from both ends on one side of the base 42 facing the storage space 50, as shown in FIG. 8, the base 42 can oppositely press the water bottle 90 through the press parts 424, so that the base 42 and the water bottle 90 are in multipoint contact, and the water bottle 90 is unlikely to slide off the storage space 50, the placement reliability of the water bottle 90 is enhanced.

Several lugs 464 protrude on the periphery of the operational unit 46, the lugs 464 protrude at one end of the operational unit 46 far from the main body 10, hereby, when the user rotates the operational unit 46 with hand or glove, the lugs 464 increase the relative friction between the user's hand or glove and the operational unit 46, so that the hand or the glove is unlikely to slip against the operational unit 46, the rotation reliability of the operational unit 46 is enhanced.

The distance between adjacent lugs 464 is larger than 6 mm and smaller than 6.5 mm, so as to further enhance the reliability of gripping the operational unit 46 to rotate.

Figure 10:
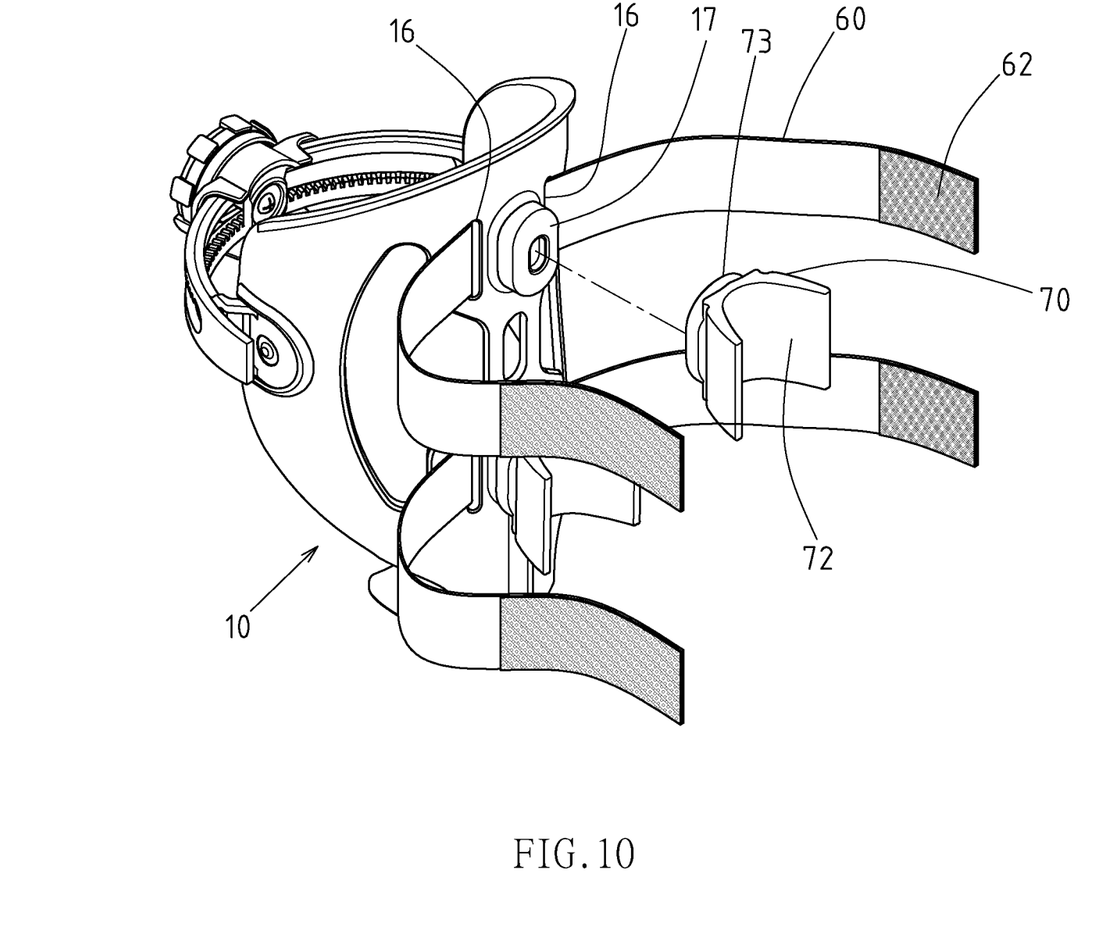
FIG. 10 is the perspective view of Embodiment 2 of the present invention.
Figure 11:
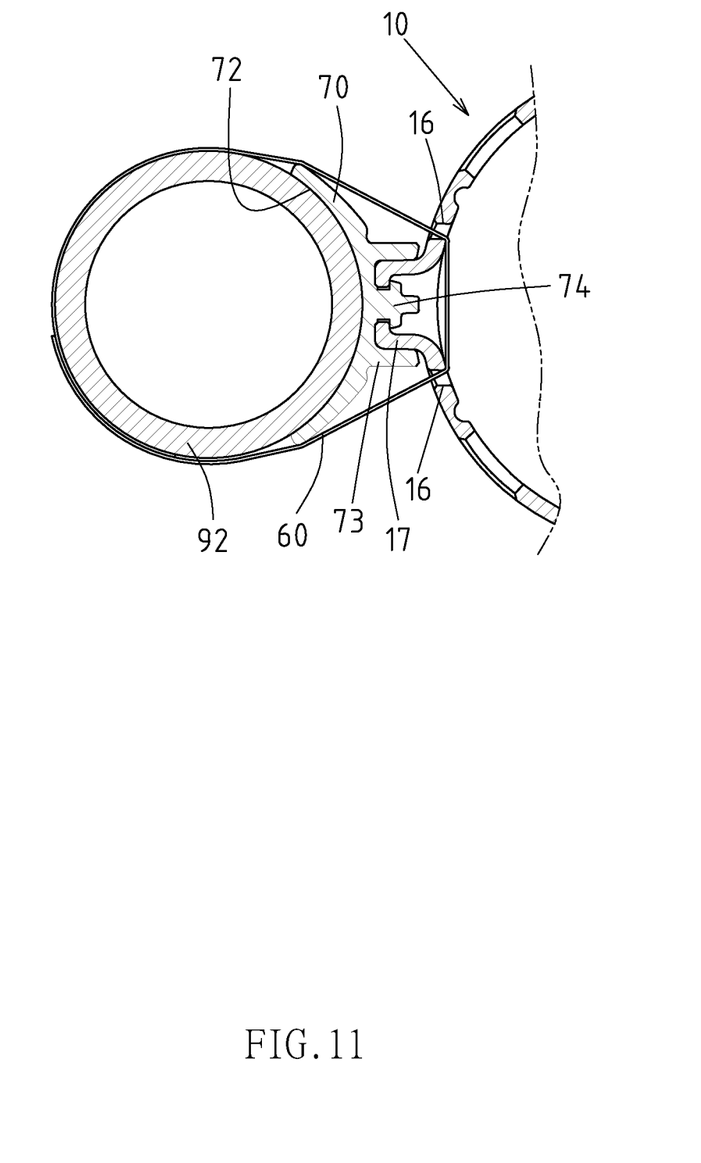
FIG. 11 is the cross-sectional view of operating state of Embodiment 2 of the present invention.

As shown in FIGS. 10 and 11, the difference of Embodiment 2 from Embodiment 1 is that the Embodiment 2 has a third girdle 60 and a pad 70, wherein two punch holes 16 penetrate the cambered midsection of the main body 10, the punch holes 16 are laterally adjacent to each other. The third girdle 60 penetrates the punch holes 16, and the third girdle 60 is provided with a separable fastener 62, hereby, to install the main body 10 on a rod 92, the main body 10 leans against the rod 92, the third girdle 60 coils round the rod 92 to fix the main body 10 to the rod 92, the rod 92 can be the stem or head tube or cross tube of bicycle frame, and the rod 92 can be a shaft or a pipe configured on ships or cars, hereby, the present invention can locate the water bottle in different unstable dynamic environments using the third girdle 60 (not shown in the figure).

The pad 70 is disposed on the cambered outer edge of the main body 10. Both sides of the pad 70 shall be adjacent to the punch holes 16, and a cambered surface 72 is formed on one side of the pad 70 far from the main body 10, so that the pad 70 adheres to the rod 92 through the cambered surface 72, the reliability of locating the main body 10 on the rod 92 is increased. The preferable material of the pad 70 is rubber or silica gel or other elastic materials. A bulge 17 protrudes on the outer edge of the main body 10, the pad 70 and the bulge 17 form an annular sheath 73. The sheath 73 bushes the bulge 17, so as to enhance the reliability of relative positioning of the pad 70 and the main body 10. In addition, a plug pin 74 protrudes on the pad 70, the plug pin 74 is inserted in the bulge 17.

We claim:

1. A bottle cage for universal water bottle sizes, the bottle cage comprising:
a main body, the main body is a cambered sheet, the main body is provided with a supporting plate from a bottom edge of cambered midsection to a cambered inner edge of the main body, the main body and the supporting plate enclose an open storage space, and the supporting plate is located in a lower part of the storage space, so that a water bottle can be placed in the storage space, two cambered ends of the main body are a first side and a second side respectively;

a first girdle, the first girdle is a cambered long band, a cambered inner edge of the first girdle is laterally opposite to the main body, and the storage space is formed between the main body and the first girdle; one end of the first girdle expands to form a first connecting part, the first connecting part leans against an outer side of the first side, and the first connecting part and the first side are riveted by a first pin; the first girdle penetrates a first elongated slot, both ends of the first elongated slot point at both ends of the first girdle respectively; the first girdle forms a first cage on the bottom edge of the first elongated slot, several first convex teeth of the first cage protrude upwards into the first elongated slot;

a second girdle, the second girdle is a cambered long band, a cambered inner edge of the second girdle is adjacent to the cambered outer edge of the first girdle; one end of the second girdle expands to form a second connecting part; the second connecting part leans against the outer side of the second side, and the second connecting part and the second side are riveted by a second pin; the second connecting part is provided with a through groove, the first girdle passes through the through groove; the second girdle penetrates a second elongated slot; both ends of the second elongated slot point at both ends of the second girdle respectively; the second girdle forms a second cage on the top edge of the second elongated slot; several second convex teeth of the second cage protrude downwards into the second elongated slot; and a regulating structure, the regulating structure comprises a base, a gear and an operational unit; the base laterally penetrates a channel, the first girdle and the second girdle penetrate through the channel respectively, the gear is disposed in the channel, and the gear axially penetrates the first elongated slot and the second elongated slot; the gear engages with the first cage and the second cage, so that the gear brakes reverse actuation of the first girdle and the second girdle; the operational unit is fitted over one end of the base far from the main body, the operational unit is in contact with the gear, to brake a rotation of the gear, so as to change a enclosure of the storage space among the main body, the first girdle and the second girdle for placing the water bottles of different sizes.

2. The bottle cage for universal water bottle sizes of claim 1, wherein a first bulge protrudes on the outer side of the first side, the inner edge of the first bulge is adjacent to the first connecting part, so as to position the first connecting part; a second bulge protrudes on the outer side of the second side, the inner edge of the second bulge is adjacent to the second connecting part, so as to position the second connecting part.

3. The bottle cage for universal water bottle sizes of claim 1, wherein several press parts protrude towards the main body from both ends on one side of the base facing the storage space, so that the base oppositely presses the water bottle through the press parts, a reliability of placing the water bottle is enhanced.

4. The bottle cage for universal water bottle sizes of claim 1, wherein a holding chamber is formed inside the base, one end of the holding chamber is connected to the channel, the other end of the holding chamber is connected to one end of the base far from the main body, several third convex teeth are arranged annularly on an internal circumference of the holding chamber;

a disc body is disposed at an axial end of the gear, the disc body is disposed in the holding chamber, the outer edge of the disc body is adjacent to the third convex tooth, the disc body axially penetrates several movable slots; one end of the movable slot extends to the outer edge of the disc body; the disc body forms several insertion openings; the disc body forms a first side wall and a second side wall on the circumference of the insertion opening; the first side wall is in contact with the outer edge of the disc body; the insertion openings are adjacent to the movable slots respectively; a long propping part is formed between the adjacent insertion openings and movable slots of the disc body; the second side wall is formed on one side of the propping part, and the end of the propping part obliquely props the preset third convex tooth;

the operational unit is axially provided with a shaft lever, the shaft lever is pivoted on the gear and the disc body, a bolt is screwed in the shaft lever through one end of the base facing the main body, so as to locate the operational unit on the base; the operational unit is provided with several brake parts, the brake parts extend to the insertion openings, and the brake parts prop the first side wall and the second side wall, so as to brake the rotation of the disc body and the gear.

5. The bottle cage for universal water bottle sizes of claim 4, wherein a first bulge protrudes on the outer side of the first side, the inner edge of the first bulge is adjacent to the first connecting part, so as to position the first connecting part; a second bulge protrudes on the outer side of the second side, the inner edge of the second bulge is adjacent to the second connecting part, so as to position the second connecting part.

6. The bottle cage for universal water bottle sizes of claim 4, wherein several press parts protrude towards the main body from both ends on one side of the base facing the storage space, so that the base oppositely presses the water bottle through the press parts, a reliability of placing the water bottle is enhanced.

7. The bottle cage for universal water bottle sizes of claim 1, wherein a junction of the first connecting part and the first girdle is located between the first elongated slot and the first side, a junction of the second connecting part and the second girdle is located between the second elongated slot and the second side.

8. The bottle cage for universal water bottle sizes of claim 7, wherein a first bulge protrudes on the outer side of the first side, the inner edge of the first bulge is adjacent to the first connecting part, so as to position the first connecting part; a second bulge protrudes on the outer side of the second side, the inner edge of the second bulge is adjacent to the second connecting part, so as to position the second connecting part.

9. The bottle cage for universal water bottle sizes of claim 7, wherein several press parts protrude towards the main body from both ends on one side of the base facing the storage space, so that the base oppositely presses the water bottle through the press parts, a reliability of placing the water bottle is enhanced.

10. The bottle cage for universal water bottle sizes of claim 1, wherein the lateral distance between one end of the first connecting part near the regulating structure and the first side is less than or equal to 4 mm, and the lateral distance between one end of the second connecting part near the regulating structure and the second side is less than or equal to 4 mm.

11. The bottle cage for universal water bottle sizes of claim 10, wherein a first bulge protrudes on the outer side of the first side, the inner edge of the first bulge is adjacent to the first connecting part, so as to position the first connecting part; a second bulge protrudes on the outer side of the second side, the inner edge of the second bulge is adjacent to the second connecting part, so as to position the second connecting part.

12. The bottle cage for universal water bottle sizes of claim 10, wherein several press parts protrude towards the main body from both ends on one side of the base facing the storage space, so that the base oppositely presses the water bottle through the press parts, a reliability of placing the water bottle is enhanced.

* * * * *